United States Patent
Gross et al.

(10) Patent No.: US 10,606,919 B2
(45) Date of Patent: Mar. 31, 2020

(54) BIVARIATE OPTIMIZATION TECHNIQUE FOR TUNING SPRT PARAMETERS TO FACILITATE PROGNOSTIC SURVEILLANCE OF SENSOR DATA FROM POWER PLANTS

(71) Applicant: Oracle International Corporation, Redwood Shores, CA (US)

(72) Inventors: Kenny C. Gross, Escondido, CA (US); Mengying Li, La Jolla, CA (US); Tahereh Masoumi, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 241 days.

(21) Appl. No.: 15/826,461

(22) Filed: Nov. 29, 2017

(65) Prior Publication Data

US 2019/0163719 A1   May 30, 2019

(51) Int. Cl.
*G06F 17/18*   (2006.01)
*G01M 99/00*   (2011.01)
*G06F 17/11*   (2006.01)

(52) U.S. Cl.
CPC .......... *G06F 17/18* (2013.01); *G01M 99/005* (2013.01); *G06F 17/11* (2013.01)

(58) Field of Classification Search
CPC ...... G06F 17/18; G06F 17/11; G06F 11/3447; G06F 11/00; G06F 11/0751
See application file for complete search history.

(56) References Cited

U.S. PATENT DOCUMENTS

| | | | | |
|---|---|---|---|---|
| 5,629,872 A * | 5/1997 | Gross | ....................... | G05B 9/03 702/116 |
| 5,745,382 A * | 4/1998 | Vilim | ................... | G05B 23/024 706/16 |
| 7,523,014 B2 * | 4/2009 | Whisnant | ............ | G06F 11/0751 702/179 |
| 7,613,576 B2 * | 11/2009 | Gross | ..................... | G06F 11/00 324/628 |
| 7,870,440 B2 * | 1/2011 | Vacar | .................... | G06F 11/008 714/47.1 |

(Continued)

*Primary Examiner* — Mohamed Charioui
(74) *Attorney, Agent, or Firm* — Park, Vaughan, Fleming & Dowler LLP

(57) ABSTRACT

We present a system that performs prognostic surveillance operations based on sensor signals from a power plant and critical assets in the transmission and distribution grid. The system obtains signals comprising time-series data obtained from sensors during operation of the power plant and associated transmission grid. The system uses an inferential model trained on previously received signals to generate estimated values for the signals. The system then performs a pairwise differencing operation between actual values and the estimated values for the signals to produce residuals. The system subsequently performs a sequential probability ratio test (SPRT) on the residuals to detect incipient anomalies that arise during operation of the power plant and associated transmission grid. While performing the SPRT, the system dynamically updates SPRT parameters to compensate for non-Gaussian artifacts that arise in the sensor data due to changing operating conditions. When an anomaly is detected, the system generates a notification.

17 Claims, 12 Drawing Sheets

(56) References Cited

U.S. PATENT DOCUMENTS

| | | | | |
|---|---|---|---|---|
| 2003/0018928 A1* | 1/2003 | James | ................... | G05B 17/02 |
| | | | | 714/25 |
| 2003/0055607 A1* | 3/2003 | Wegerich | ............ | G06F 11/3447 |
| | | | | 702/188 |
| 2010/0332199 A1* | 12/2010 | Dhanekula | .......... | G06F 11/0751 |
| | | | | 703/2 |

* cited by examiner

BIVARIATE OPTIMIZATION TECHNIQUE FOR TUNING SPRT PARAMETERS TO FACILITATE PROGNOSTIC SURVEILLANCE OF SENSOR DATA FROM POWER PLANTS

BACKGROUND

Field

The disclosed embodiments generally relate to techniques for monitoring the operational health of electrical power plants and associated critical assets in the transmission and distribution grids. More specifically, the disclosed embodiments relate to a bivariate technique for tuning sequential probability ratio test (SPRT) parameters to facilitate prognostic surveillance of non-Gaussian sensor data from power plants.

Related Art

Electrical generation plants, such as gas-fired or coal-fired power plants, nuclear plants and wind farms, include numerous components, such as pumps, turbines and transformers, which routinely degrade over time and fail. Degradation of these components can be costly. For example, a pump in a nuclear plant can weigh up to 30 tons and can be radioactive, which means that repairing such a pump can take many weeks.

To reduce such costs, it is advantageous to proactively monitor components in power plants and the distribution grid to detect degradation early on, which makes it possible to fix impending problems while they are small. This type of proactive surveillance operates by monitoring time-series data from sensors in power plant and grid components, wherein the time-series data includes various parameters, such as temperatures, vibrations, voltages and currents. This time-series data can be analyzed using a prognostic surveillance technique, such as SPRT, to detect subtle degradation modes at the earliest incipience of the degradation. (For example, see U.S. Pat. No. 5,987,399, entitled "Ultrasensitive Surveillance of Sensors and Processes," by inventors Stephan W. Wegerich, et al., issued Nov. 16, 1999) The SPRT technique can be used effectively in many systems to detect the incipience of degradation.

However, to operate effectively, SPRT relies on the time-series signals having a stationary, Gaussian distribution. A random stochastic process whose statistical moments are independent of time is said to be stationary. Some of the time-series signals from components in power plants are always stationary, at least during un-degraded operation. However, the majority of time-series signals in power plants are non-stationary, and/or have non-Gaussian noise contamination, and hence can vary dynamically during routine operation. Hence, the conventional SPRT technique may be ineffective in monitoring such non-stationary time-series signals.

What is needed is a prognostic-surveillance technique that can be used to effectively monitor dynamic, non-stationary, non-Gaussian time-series signals from power plants.

SUMMARY

The disclosed embodiments relate to a system that performs prognostic surveillance operations based on sensor signals from a power plant and distribution grid. During operation, the system obtains signals comprising time-series data obtained from sensors in the power plant and associated transmission grid during operation of the power plant and associated transmission grid. Next, the system uses an inferential model trained on previously received signals from the power plant and associated transmission grid to generate estimated values for the signals based on correlations between the signals. The system then performs a pairwise differencing operation between actual values and the estimated values for the signals to produce residuals. The system subsequently performs a sequential probability ratio test (SPRT) on the residuals to detect incipient anomalies that arise during operation of the power plant and associated transmission grid. While performing the SPRT, the system dynamically updates SPRT parameters to compensate for non-Gaussian artifacts that arise in the sensor data due to changing operating conditions in the power plant and associated transmission grid. Finally, when an incipient anomaly is detected, the system generates a notification regarding the anomaly.

In some embodiments, while dynamically updating the SPRT parameters, the system performs a bivariate optimization operation, which varies both a system disturbance magnitude parameter m and a variance parameter v, while seeking to minimize a resulting decision-time value ASN and maintaining a resulting empirical false alarm probability $\alpha_E$ below a threshold value $\alpha_t$.

In some embodiments, while performing the bivariate optimization operation, the system performs additional SPRT operations on the signals, wherein m and v are iteratively varied in both positive and negative directions to produce resulting values for $\alpha_E$ and ASN. While performing the additional SPRT operations, the system updates the m and v parameters whenever an additional SPRT operation causes a resulting ASN value to be reduced while a resulting $\alpha_E$ value remains less than $\alpha_t$.

In some embodiments, the bivariate optimization operation performs an initial SPRT operation using initial parameter values $m=m_0$ and $v=v_0$. If a resulting $\alpha_E$ value from the initial SPRT operation is greater than $\alpha_t$, the system iteratively performs additional SPRT operations wherein v is increased until a resulting $\alpha_E$ value is less than $\alpha_t$.

In some embodiments, the step sizes for the iterative variations of m and v are reduced as the m and v parameters converge toward optimal values, which minimize a resulting ASN value while maintaining a resulting $\alpha_E$ value below $\alpha_t$.

In some embodiments, the inferential model is trained using a nonlinear, nonparametric (NLNP) regression technique.

In some embodiments, the NLNP regression technique comprises a Multivariate State Estimation Technique (MSET).

In some embodiments, detecting the incipient anomaly comprises detecting an impending failure of a component in the power plant or distribution grid.

In some embodiments, the signals are obtained from one or more of the following types of components in the power plant: a pump, a turbine, a motor, a generator, a mechanical gear box, a transformer, a fluid-fluid or fluid-air heat-exchanger, and an air blower.

In some embodiments, the signals are obtained from one or more of the following types of sensors located in components in the power plant: a voltage sensor; a current sensor; a pressure sensor; a rotational speed sensor; and a vibration sensor.

DETAILED DESCRIPTION

Figure 1:
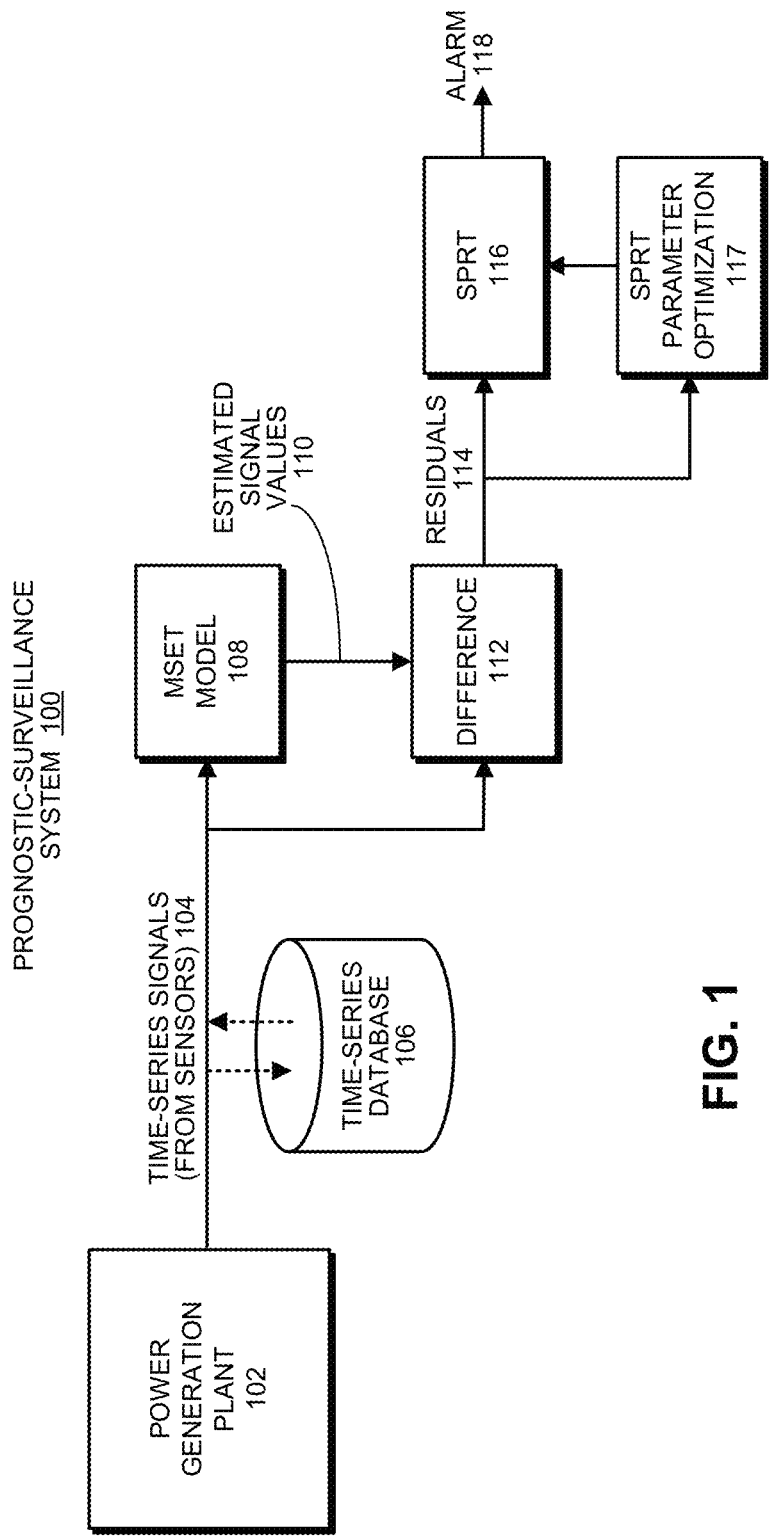
FIG. 1 illustrates an exemplary prognostic-surveillance system for a power generation plant in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a new prognostic-surveillance technique, which makes the SPRT robust to deviations in stationarity as well as non-Gaussian distribution moments for monitored signals. This new technique provides a comprehensive methodology for evaluating, tuning, optimizing, and validating advanced pattern-recognition systems, which combine empirical nonlinear modeling to produce residuals. SPRT-based "detectors" then monitor these residuals in real-time to facilitate sensitive detection of the onset of subtle anomalies in noisy process variables, whether the original measured signals are stationary or contain dynamic components, or are contaminated by non-Gaussian noise artifacts. Before describing details of this new technique, we first describe an exemplary prognostic-surveillance system in which it operates.

Exemplary Prognostics-Surveillance System for a Power Generation Plant

FIG. 1 illustrates an exemplary prognostic-surveillance system 100 for a power generation plant 102 in accordance with the disclosed embodiments. As illustrated in FIG. 1, prognostic-surveillance system 100 operates on a set of time-series signals 104 obtained from sensors in power generation plant 102. Note that power generation plant 102 can generally include any type of facility that generates electricity, including gas-fired or coal-fired power plants, geothermal power plants, biomass-fueled power plants, nuclear plants, solar-thermal-electric power plants or wind farms. Time-series signals 104 can generally be obtained from any component in a power plant and associated transmission/distribution grid, including: a pump, a turbine, a motor, a generator, a mechanical gear box, a transformer, a fluid-fluid or fluid-air heat-exchanger, and an air blower. Moreover, time-series signals 104 can originate from any type of sensor, which can be located in a component in the power plant, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series data 104 either feeds directly from power generation plant 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, an MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses," *Annals of Mathematical Statistics.* 16 (2): 117-186) In this way, prognostic-surveillance system 100 can proactively alert power system operators of incipient anomalies, such as impending failures, hopefully with enough lead time so that such problems can be avoided or proactively fixed.

The SPRT provides a basis for detecting subtle statistical changes in a stationary noisy sequence of observations at the earliest possible time. For purposes of exposing the details of the SPRT, assume that the monitored process signal Y is normally distributed with mean zero and standard deviation $\sigma$. (Note that processes with nonzero mean $\mu$ can be transformed into a zero-mean process by subtracting $\mu$ from each observation). A signal Y is said to be degraded if the observations made on Y appear to be distributed about mean M or with altered distribution moments (skewness, kurtosis), versus normal distribution moments centered at mean zero, where M is a predetermined system disturbance magnitude.

The SPRT provides a quantitative framework for deciding, with each new incoming observation, between two hypotheses $H_0$ and $H_1$, which are related to signal degradation. Under hypothesis $H_0$, observations of Y are drawn from a normal distribution with mean zero and standard deviation $\sigma$. In contrast, under hypothesis $H_1$, observations of Y are drawn from a normal distribution with mean M and standard deviation $\sigma$.

The SPRT is a parametric test, meaning that the probability density function and associated parameters must be known prior to applying the SPRT. Wald's original SPRT was derived for normally distributed (i.e., Gaussian) observations of process signal Y. One can derive expressions for other distributions (e.g., exponential, Poisson, binomial) as well. In practical prognostic applications, however, it may be difficult to assume that: (1) the distribution of a process signal is known in advance; (2) the distribution of a process signal does not change over time; and (3) the parameters of the distribution do not change over time.

Nonparametric sequential detection tests do exist, but the mathematics behind them are considerably more complex than for the parametric, Gaussian SPRT. Even if the *a priori* distribution is known, the third assumption above is often violated in practical industrial systems. A nominally stationary Gaussian random process may enter a new operating regime (characterized by a different mean value, or different 2nd and 3rd moments) upon influence from stimuli. For example, in power-generation systems, a sudden change in the amount of electricity being generated may cause a monitored voltage or current signal to have an upward or downward step change in its nominal value. In this case a simple Gaussian SPRT would flag such a step change as a degraded signal, because the observations no longer appear to be drawn from a distribution conforming to the original $H_0$ hypothesis.

A better solution than going to a nonparametric SPRT is to combine the SPRT with a good nonparametric prognostic machine-learning (ML) technique, which effectively learns and then "filters out" the non-Gaussian dynamics, which are inherent in the monitored systems or processes. In this specification, we present an extension of proven prognostic innovations through a combination of an excellent ML technique and a simple parametric SPRT, which has a low compute cost for real-time streaming applications. This yields the same prognostic return on investment (ROI) as the traditional Wald SPRT with the additional advantage of robustness to non-Gaussian artifacts, and without having to use complex and costly nonparametric SPRT implementations.

Instead of attempting to adjust the SPRT's $H_0$ and $H_1$ distribution parameters to compensate for statistical changes in the process signal, we have devised a technique, which employs a similarity-based modeling approach that exploits learned correlations among subsets of system signals. Some embodiments of this similarity-based modeling approach use the well-known Multivariate State Estimation Technique (MSET), although it will also work with other nonlinear, nonparametric (NLNP) ML techniques, such as neural networks (NNs), support vector machines (SVMs), and autoassociative kernel regression (AAKR).

During operation, MSET estimates the operational state of the system (i.e., the value that each signal is expected to take at time t) and compares the estimated operational state with the actual operating state (i.e., the actual values of the signals observed at time t). SPRT then determines if the difference between the estimated and actual states is due to normal statistical fluctuations in the signals, or if the difference is due to a bona fide anomaly in one or more of the signals under surveillance. This technique has been used effectively to monitor critical assets in various locations, such as: enterprise data centers, factories, transportation systems, and utilities.

Two-Dimensional Analysis

The SPRT provides an outstanding prognostic-surveillance technique when combined with ML optimizations, which facilitates rapid annunciation of the onset of anomalous patterns in digitized time-series signals under surveillance. The SPRT is "optimal" in the sense that it provides the fastest mathematically possible annunciation of subtle disturbances in noisy process variables, and allows experts setting up prognostics systems to independently specify the false-alarm and missed-alarm probabilities. This is in sharp contrast to conventional prognostic-surveillance techniques, which are based on threshold-limit tests.

Many industrial processes utilize embedded diagnostic systems and online statistical process-control mechanisms that perform real-time analysis of process variables with sophisticated pattern recognition. However, these systems then employ threshold-based tests, which are only sensitive to gross changes in the process mean or to large step changes that exceed some threshold-limit, to determine whether a failure has occurred or a process is drifting out of control. Hence, these conventional techniques suffer from either large false-alarm rates if the thresholds are set too close, or high missed or delayed alarm rates if the thresholds are set too wide.

For typical industrial-surveillance applications, false alarms can be very costly in terms of plant or physical-asset down time. However, missed alarms can be even more costly when incipient problems are not identified and expensive assets fail catastrophically.

A system that combines ML pattern recognition with SPRT is advantageous because it is sensitive not only to disturbances in signal mean, but also to subtle changes in the statistical moments of the monitored signals and the patterns of correlation among multiple types of signals. Hence, a system that combines MSET (or a similar NLNP pattern-recognition technique) with the SPRT can detect subtle statistical anomalies in noisy process signals at the earliest mathematically possible time. This provides actionable warning-alert information on the type and the exact time of onset of an impending disturbance. Also, instead of simple threshold limits that trigger faults when a signal increases beyond some threshold value, the SPRT technique is based on user-specified false-alarm and missed-alarm probabilities, which allows the user to control the likelihood of missed detection or false alarms.

For sudden, gross failures of sensors or system components, the SPRT annunciates the disturbance as fast as a conventional threshold-limit test. However, for slow degradation that evolves over a long period of time, the SPRT raises a warning of the incipience of the disturbance long before it would be apparent to any conventional threshold-based test.

In spite of the outstanding features and performance of an SPRT based "detector" technique, there is still a great deal of latitude in adjustment and optimization of SPRT input parameters ($\alpha$, $\beta$, and M), and in the adjustment of empirical signal attributes $\mu$ and $\sigma^2$, all of which affect overall SPRT prognostic performance, often in non-intuitive ways. It is important to clarify what is meant by "adjustment" of empirical attributes $\mu$ and $\sigma^2$ for the signals under surveillance. Recall that for ML anomaly-detection prognostics, the signals being processed by the SPRT detector are "residuals" computed by differencing the predicted signals from the corresponding measured signals. (The parameter $\mu$ refers to the bias in the residuals, and $\sigma^2$ to the variance of the residuals) When $\mu$ and $\sigma^2$ are computed with the fastest-sampling rate raw signals, this often results in sub-optimal SPRT performance in terms of empirical $\alpha$, empirical $\beta$, and/or "time-to-detection." When this is the case, it is very easy to improve $\mu$ and/or $\sigma^2$. Improvement to the bias $\mu$ can be achieved through enhancement of the ML prognostic technique (albeit with an increased compute cost) so that the predictions reflect the patterns in the measurements with higher fidelity, while $\sigma^2$ can be diminished by a simple filtering process, for example involving moving ensemble averages, or more-sophisticated moving filters when warranted. (For a more-comprehensive description of SPRT parameters, see "Early Detection of Signal and Process Anomalies in Enterprise Computing Systems, by Kenny C. Gross and Wendy Lu, Proceedings of the 2002 International Conference on Machine Learning and Applications—ICMLA 2002, Jun. 24-27, 2002, Las Vegas, Nev., USA)

The inventors have developed a SimSPRT-II tool that can be used to make systematic adjustments of the five input parameters affecting SPRT performance. This facilitates rapid optimization of the SPRT technique in terms of achieving the fastest decision time for anomaly detection while still meeting prognostic functional requirements (PFRs) on Type-I and Type-II error rates. (See "SimSPRT-II: Monte Carlo Simulation of Sequential Probability Ratio Test Algorithms for Optimal Prognostic Performance" by Tahereh Masoumi and Kenny C. Gross, Proceedings of the 2016 International Conference on Computational Science and Computational Intelligence (CSCI), 15-17 Dec. 2016) SimSPRT-II also provides a visualization capability, which enables us to view the results of non-Gaussian artifacts in monitored signals SimSPRT-II then enables us to view how a dynamic, bivariate parameter-optimization process for the SPRT makes it possible to apply the SPRT to signals that may have non-stationarity and/or non-Gaussian contamination.

Figure 2A:
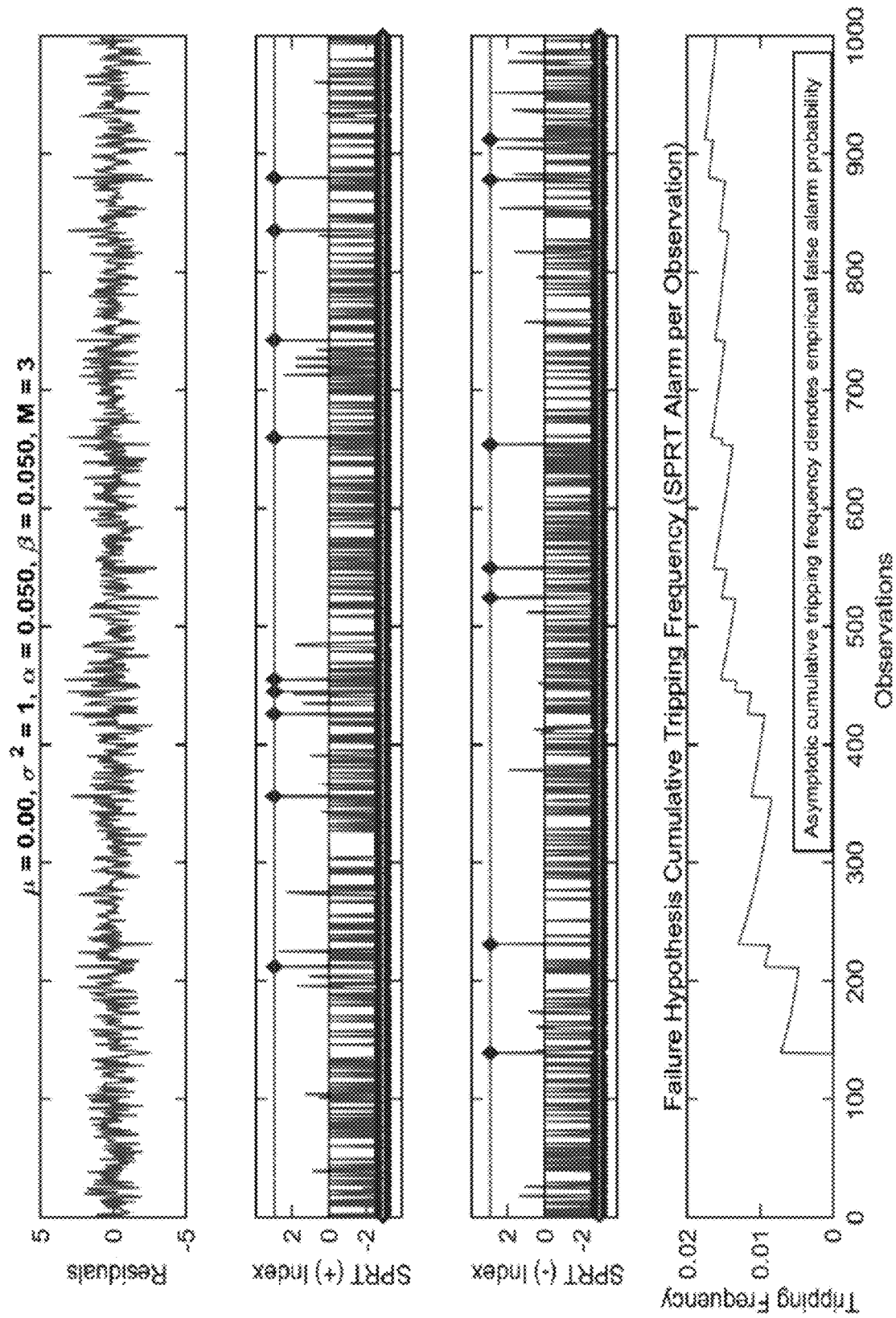
FIG. 2A presents a set of graphs illustrating SPRT behavior for fault-free signals in accordance with the disclosed embodiments.

We now describe how this bivariate parameter-optimization process operates with reference to a number of graphs. FIG. 2A presents a graph illustrating exemplary SPRT behavior for fault-free signals, which are reasonably Gaussian. The SPRT in this case is set up with an $\alpha$ of 1% and a $\beta$ of 5%. Note that these values for $\alpha$ and $\beta$ are much larger than we use for production implementations of ML prognostics, and are set to these high values to illustrate the "false" alerts in the SPRT output results, which appear in the 2nd and 3rd subplots.

Note that there is no degradation in the assets monitored by the SPRT in FIG. 2A. The SPRT alerts that occur are normal and expected from the Wald theorem. Only when the frequency of SPRT alerts exceeds the pre-specified threshold value for alpha $\alpha_t$, will a real alarm be triggered. For normal Gaussian processes, the SPRT cumulative tripping frequency, which we call "empirical alpha" $\alpha_E$, will always be lower than $\alpha_t$. In the example illustrated in FIG. 2A, $\alpha_E$ is 0.016, which is well below the $\alpha_t$ value of 0.05, as is expected for Gaussian normal processes.

Figure 2B:
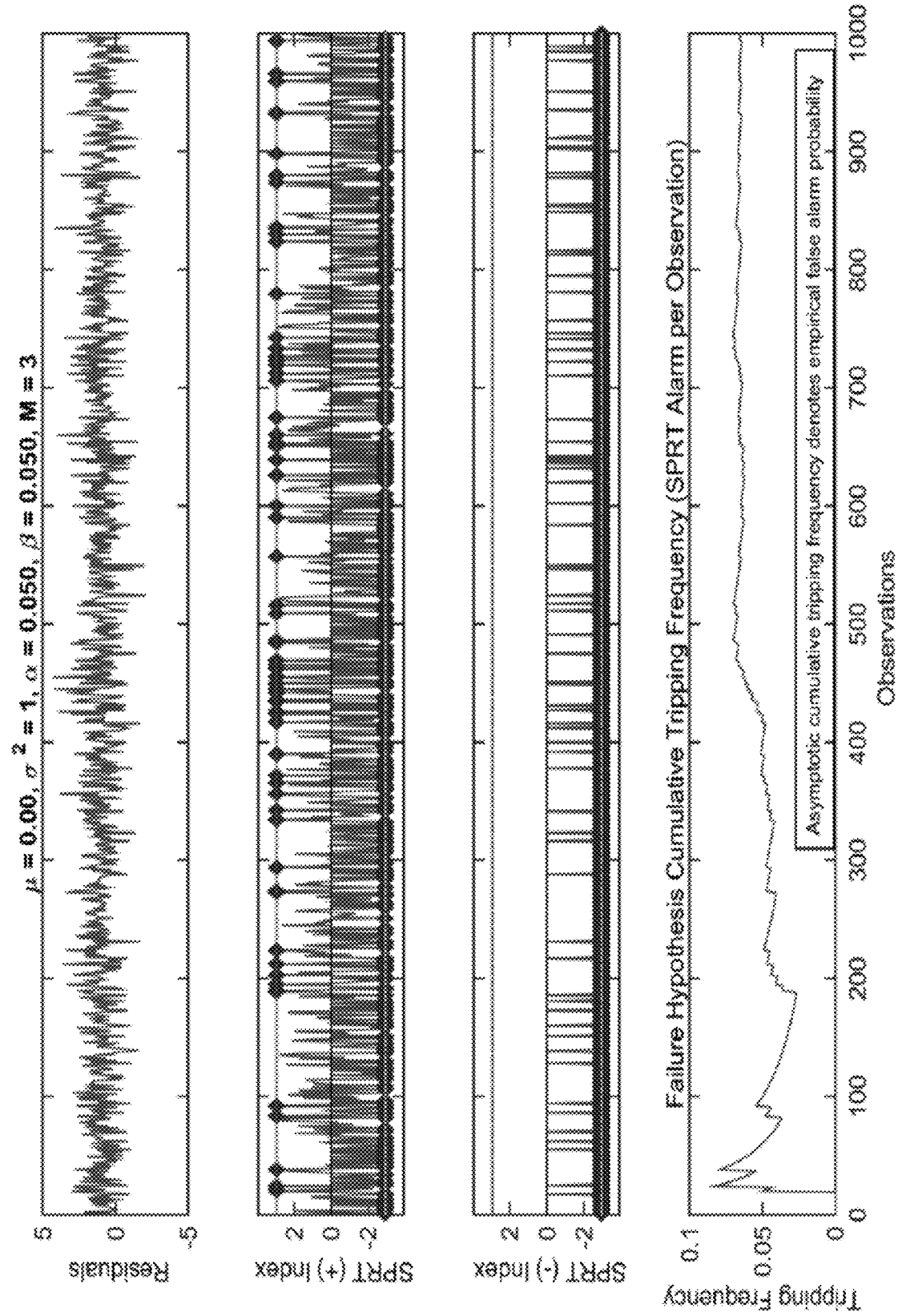
FIG. 2B presents a set of graphs illustrating SPRT behavior for fault-free signals with non-Gaussian artifacts in accordance with the disclosed embodiments.

The challenge that arises for many types of industrial ML surveillance applications is that the monitored processes can be contaminated by non-Gaussian artifacts, including bias, skewness, kurtosis, or the presence of serial correlation. When this happens, unless one adjusts the SPRT parameters, a naively tuned SPRT process will produce empirical alphas that are greater than the specified $\alpha_t$. Such a case is illustrated in FIG. 2B, where the monitored data contains a bias of 1.0 in the units of the monitored signal. Note the increasing frequency of SPRT alerts in the 2nd subplot of FIG. 2B. This SPRT is set up with an $\alpha_t$ of 5%, but we see in the bottom subplot in FIG. 2B that $\alpha_E$ is higher than $\alpha_t$ because the cumulative tripping frequency is 0.065. This is undesirable because when empirical $\alpha_E$ exceeds $\alpha_t$, false SPRT alarms are issued.

The disclosed embodiments enable SimSPRT to be used with a new bivariate parameter-optimization technique, which allows the SPRT to be applied to any signals possessing a reasonable degree of non-normality and/or non-whiteness. This enables a data scientist to be assured that $\alpha_E$ will always be lower than the pre-specified $\alpha_t$. Moreover, when $\alpha_E$ is lower than $\alpha_t$, SimSPRT will additionally identify changes to SPRT parameters that lead to the smallest attainable "decision time." This is accomplished by minimizing a parameter we call the "average sample number" (ASN), which is the average number of observations processed before the SPRT reaches a "fault" hypothesis alert.

The disclosed techniques that use SimSPRT and the new bivariate optimization technique taught herein provide the dual benefit of assuring minimal false-alarm probabilities while making a decision with the lowest achievable ASN, even when the monitored signals are contaminated with non-Gaussian artifacts. We demonstrate this new capability with 3D parametric results from SimSPRT computations in the following section.

3D Parametric Monte Carlo Simulation Results

SimSPRT performs parametric, multi-parameter simulations for any signal characteristics by permuting the adjustable SPRT parameters ($\mu$, $\sigma^2$, $\alpha$, $\beta$ and M) in a nested-loop structure to compute the asymptotic SPRT tripping frequency (i.e., $\alpha_E$, which is the false alarm probability) and the "time to detection" through the ASN, and then allows a data scientist to view $\alpha_E$ and ASN using 3D response surface methodology as bivariate pair-wise combinations of the SPRT tuning parameters.

For prognostic monitoring applications, it is desirable for ASN to be as small as possible. That translates into a very quick "time to detection" for anomalies in monitored process variables. Although it is desirable to minimize ASN, it is absolutely imperative that $\alpha_E$ does not exceed the pre-specified $\alpha_t$, which means that the false alarm rate does not exceed the specified false alarm rate established by the end customer. In the past, if the signals were contaminated by non-Gaussian artifacts and/or some degree of non-stationarity in the residuals, it would be difficult or impossible to meet these desired attributes (minimal decision time while meeting false-alarm specifications).

Figure 3:
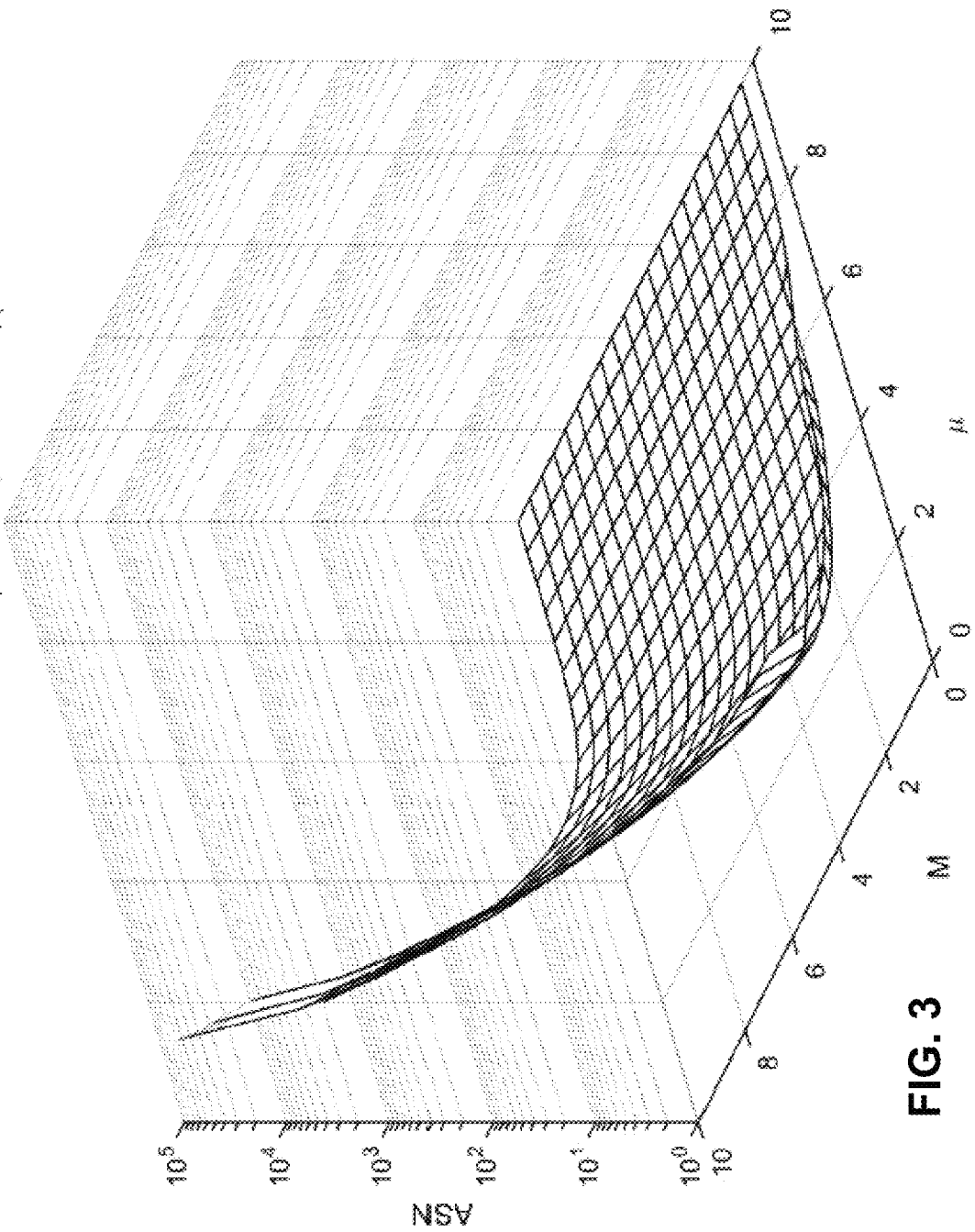
FIG. 3 presents a graph illustrating ASN as a function of M and μ in accordance with the disclosed embodiments.

FIG. 3 illustrates the large range of ASNs that result from allowable combinations of μ and M. It can be readily observed in FIG. 3 that one can get drastically different SPRT performance, in terms of "time-to-detection" (as measured by ASN) for anomalies, depending upon the spatial region in the {μ, M} plane.

Figure 4:
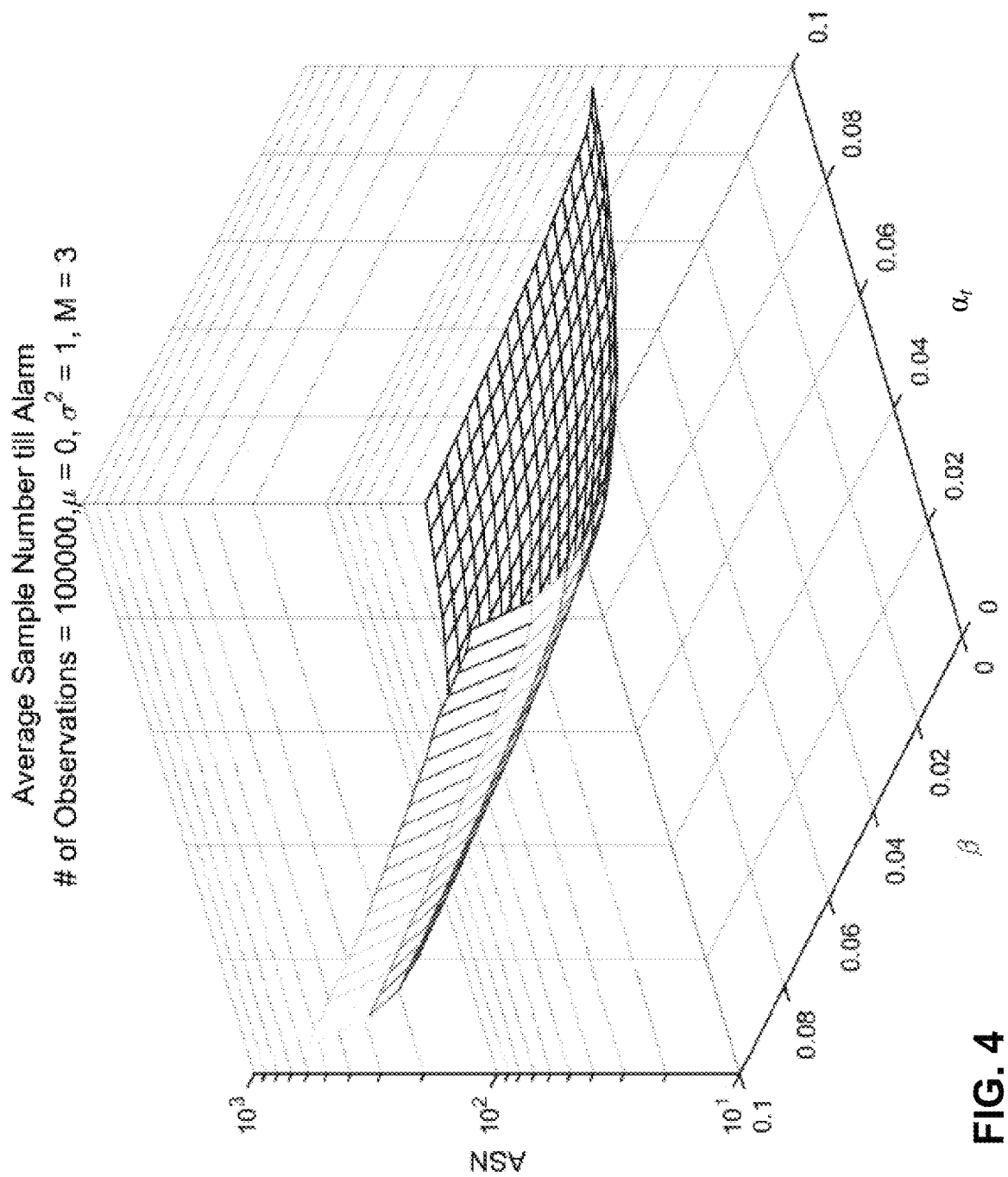
FIG. 4 presents a graph illustrating ASN as a function of α and β in accordance with the disclosed embodiments.

Moreover, for any given values of μ and M, both ASN and $\alpha_E$ also vary with the input values of α and β. This is illustrated for ASN in FIG. 4, which shows how the "time-to-detection" metric varies significantly with pair-wise combinations of {α, β}.

Figure 5:
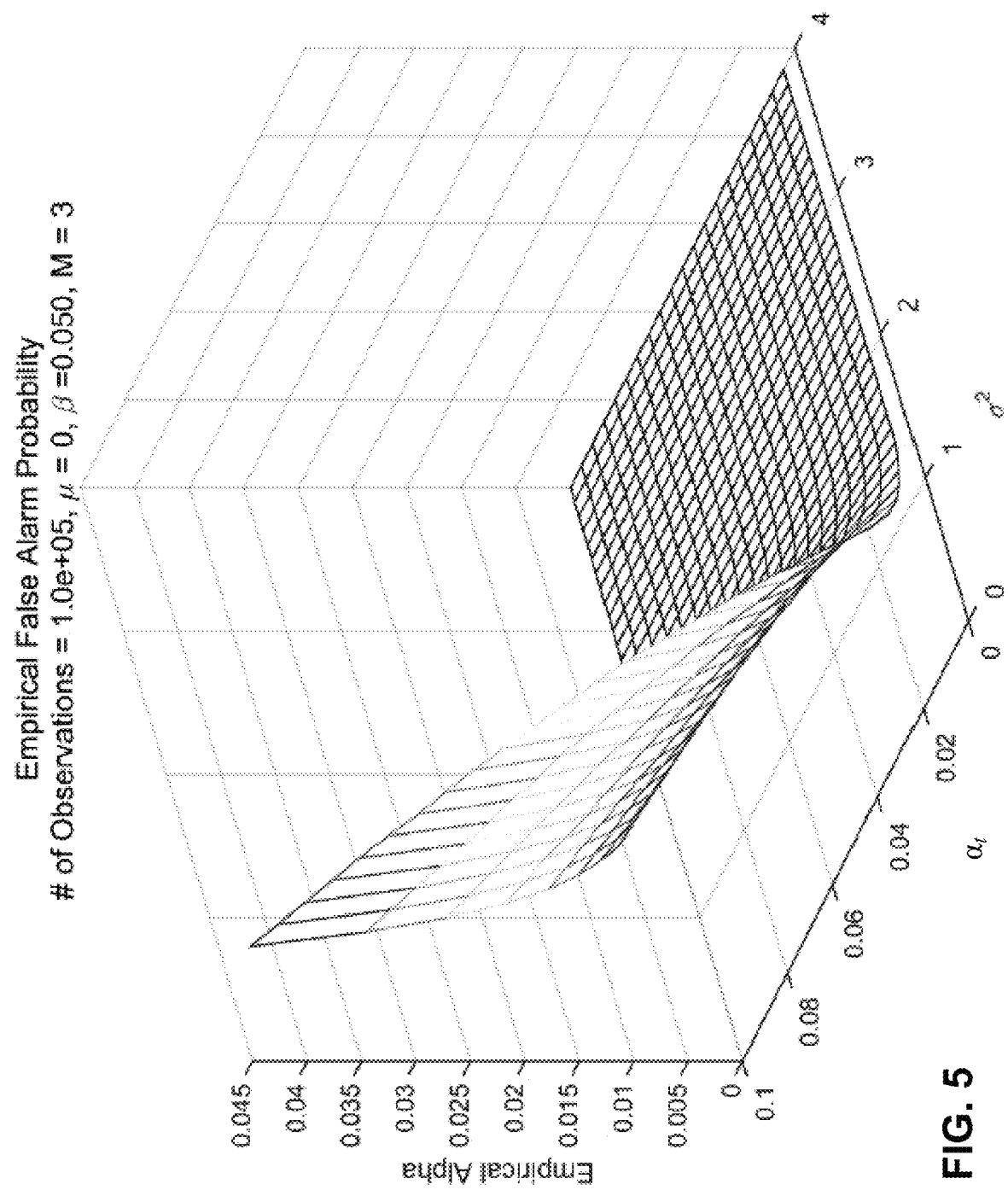
FIG. 5 presents a graph illustrating empirical α as a function of α and β in accordance with the disclosed embodiments.

FIG. 5 shows how the $\alpha_E$ varies with combinations of {α, $\sigma^2$}. Examining the constant-α contours on this surface reveals that for this application, $\alpha_E$ never exceeds $\alpha_t$. For use cases such as this, one can just pick values of the SPRT design parameters that result in a low ASN, and the system will simultaneously achieve low false alarm rates when there is no degradation present, and extremely rapid detection of subtle faults when degradation starts to appear. (Note that this capability is mathematically intractable with conventional threshold-based prognostic "detectors.") We see from FIG. 5 that when signals are reasonably stationary, the system works well. Now we want to examine the more-challenging scenario that arises in prognostic applications where the signals may not meet Gaussian and stationarity requirements.

Figure 6:
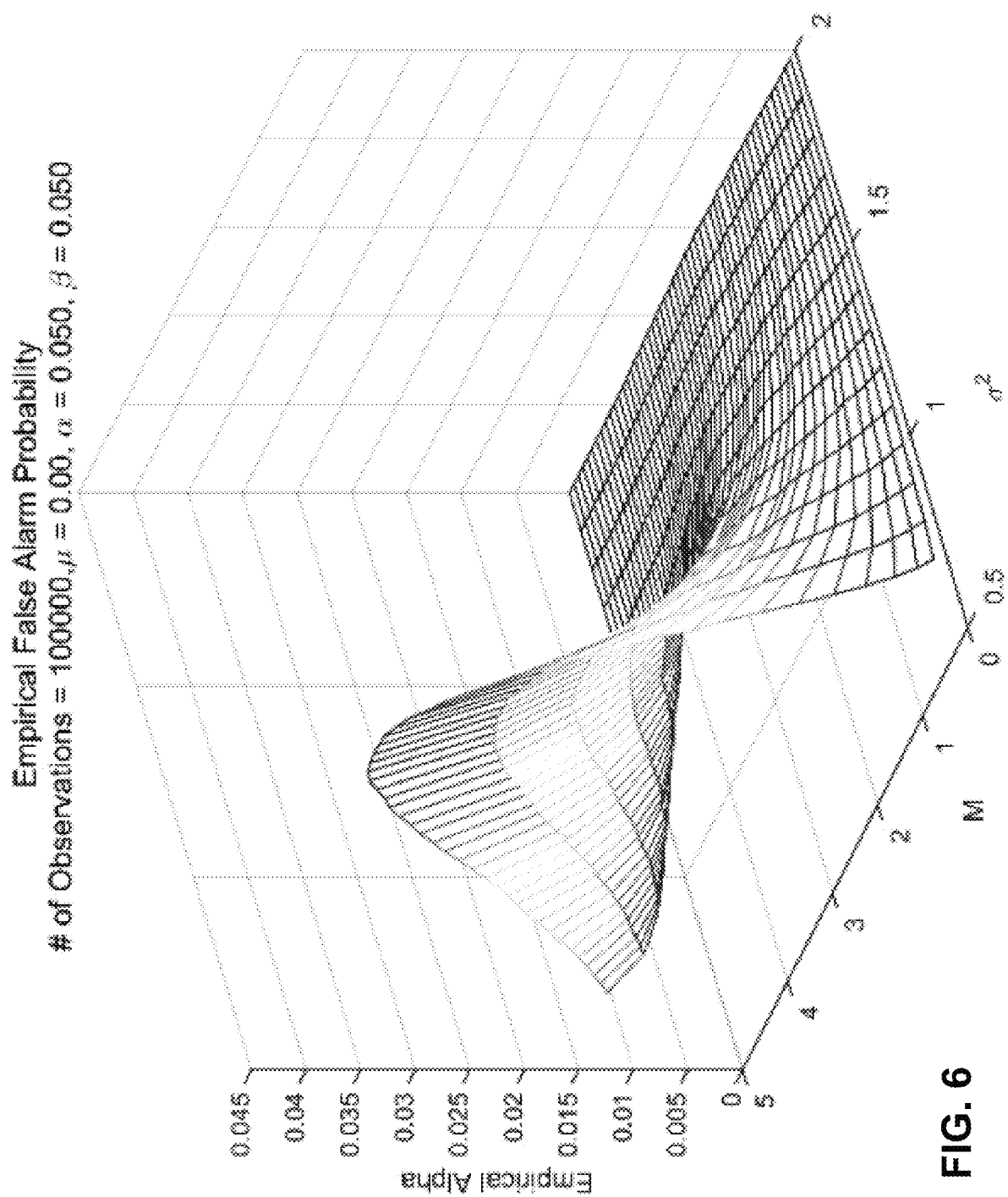
FIG. 6 presents a graph illustrating empirical α as a function of $\sigma^2$ and M in accordance with the disclosed embodiments.
Figure 7:
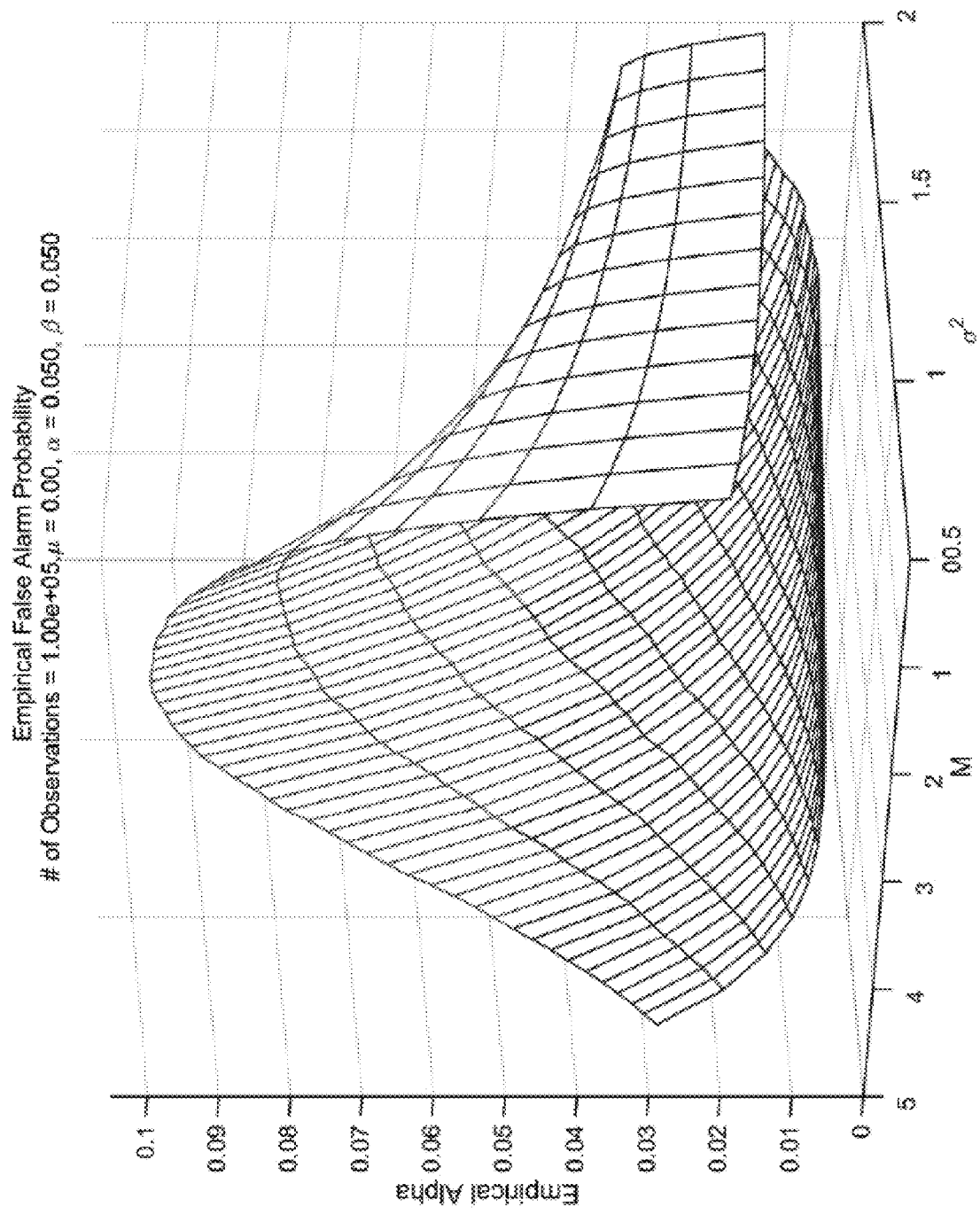
FIG. 7 presents a graph illustrating empirical α as a function of $\sigma^2$ and M, wherein empirical α can exceed a pre-specified threshold, in accordance with the disclosed embodiments.

FIG. 6 shows $\alpha_E$ as a function of various {$\sigma^2$, M} combinations. As was the case in FIG. 5, we see that for signals that are substantially Gaussian and white, as expected $\alpha_E$ is again always smaller than the pre-specified $\alpha_t$. However, for signal characteristics that possess some degree of non-normality, FIG. 7 illustrates the danger of arbitrarily selecting α, β, and M values when setting up an SPRT-detection technique. Note that for the region in FIG. 7 at the top of the 3D surface, $\alpha_E$ is greater than $\alpha_t$. The combination of M and $\sigma^2$ in that region will result in prognostic-surveillance techniques that do not meet prognostic functional requirements (PFRs) and will have excessive false alarms.

To avoid this undesirable outcome, we have developed a new innovation, in which we have integrated SimSPRT with an novel automated bivariate, SPRT-parameters optimization technique, which simultaneously assures that $\alpha_E$ will always be lower than $\alpha_t$, while the ASN (and hence the "time-to-detection" for subtle anomalies) will be minimized. To illustrate how this automated optimization process works, we first project the 3D $\alpha_E$ surface from FIG. 7 onto a 2D contour and segregate the {$\sigma^2$, M} region into an "unacceptable" region in red, where $\alpha_E$ exceeds α, versus an "acceptable" region in blue, where the prognostic functional requirement will be met (i.e., $\alpha_E$<α).

A brute-force approach to identifying the lowest ASN in an acceptable region would be to just compute the ASN for all possible {M, $\sigma^2$} pairs and select the pair achieving the lowest ASN. However, this is computationally very expensive. Instead, we select a starting point in the acceptable blue region, and we employ a newly devised approach that "marches downhill" toward lower ASN values, staying in the blue "acceptable false-alarm-probability" region, and stops when the improvement in ASN is <1%. This new approach for simultaneously optimizing empirical false alarm probability and time-to-detection is able to rapidly achieve an optimal solution, usually with less than 15 evaluations of ASN during the optimization, as opposed to thousands of evaluations of ASN using the "brute force" approach.

Hence, the disclosed embodiments provide a new technique for making the SPRT robust with respect to non-Gaussian artifacts in the monitored signals by using a bivariate parameter-optimization technique, which simultaneously achieves functional-specification assurance for false-alarm probabilities, and a quick decision time for detection of subtle anomalies growing into noisy process variables.

Prognostic Surveillance Operation

Figure 8:
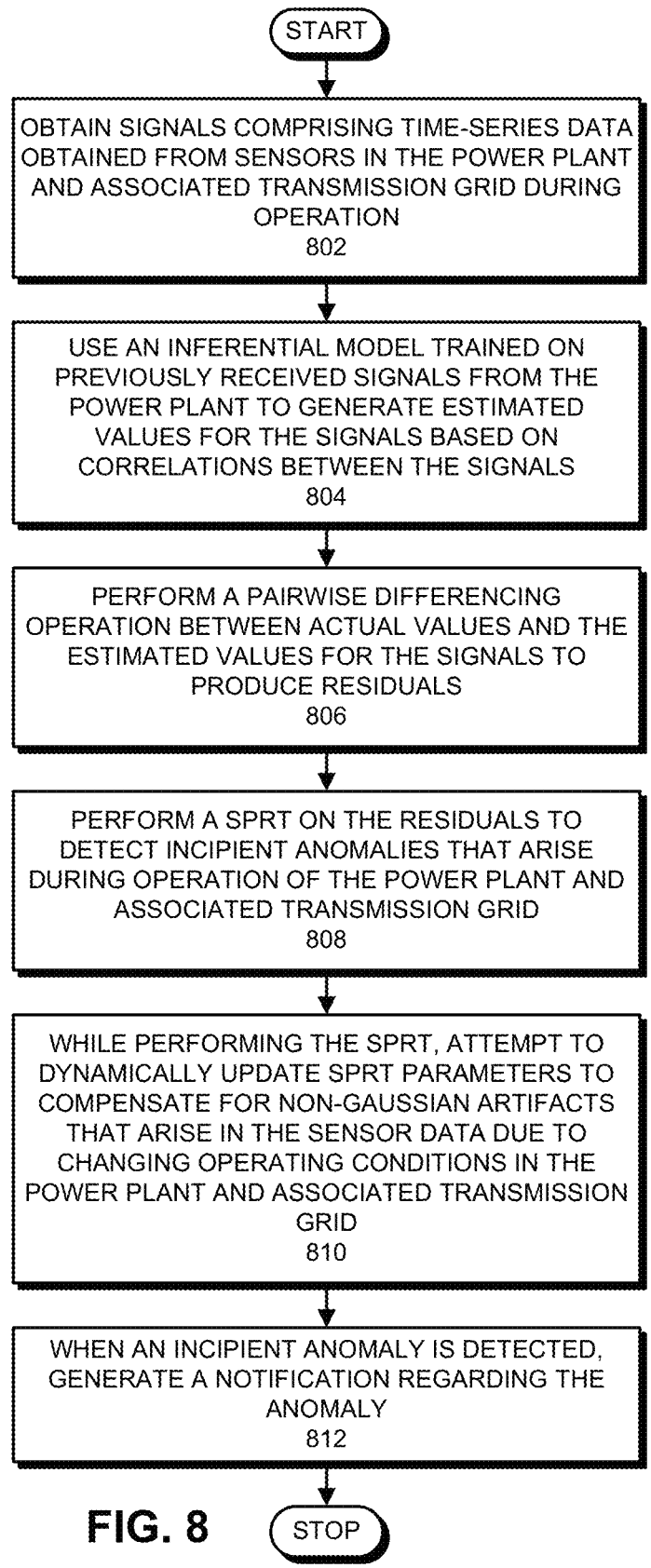
FIG. 8 presents a flow chart illustrating the process of performing prognostic-surveillance operations based on sensor signals from a power plant and associated transmission grid in accordance with the disclosed embodiments.
Figure 9:
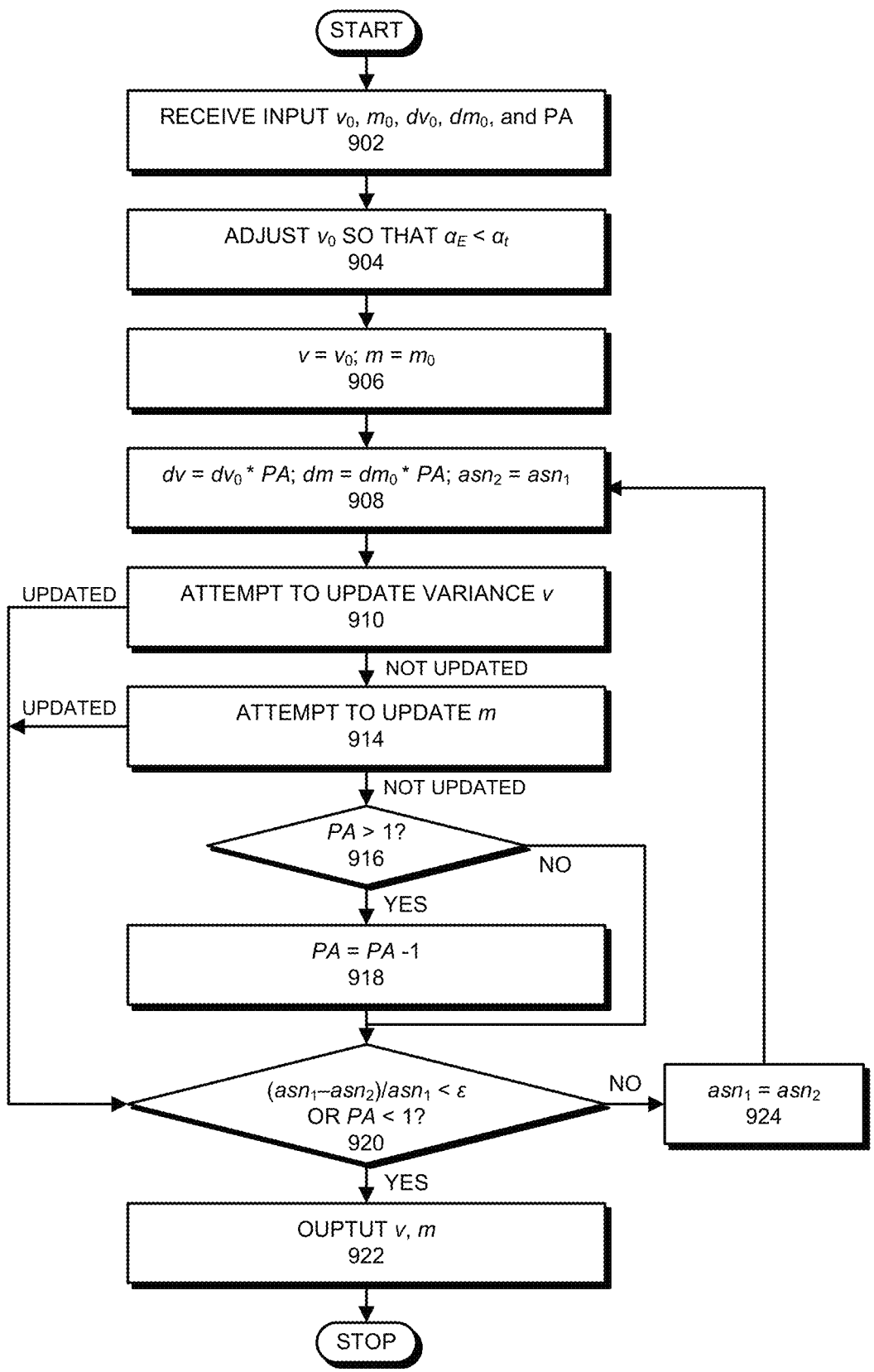
FIG. 9 presents a flow chart illustrating the bivariate optimization process in accordance with the disclosed embodiments.
Figure 10A:
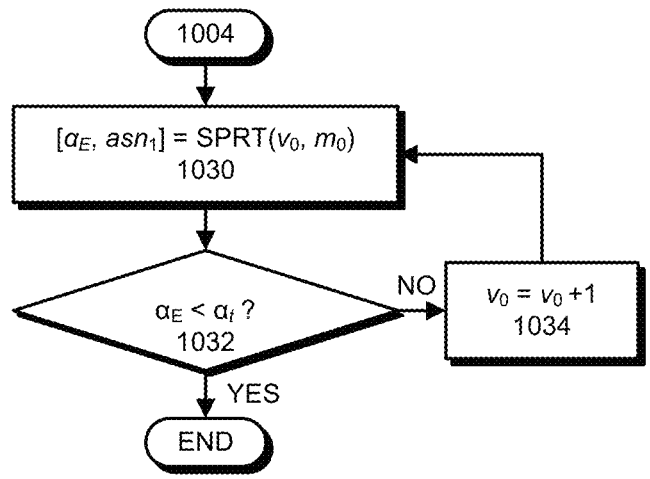
FIGS. 10A-10C presents additional flow charts illustrating aspects of the bivariate optimization process in accordance with the disclosed embodiments.
Figure 10B:
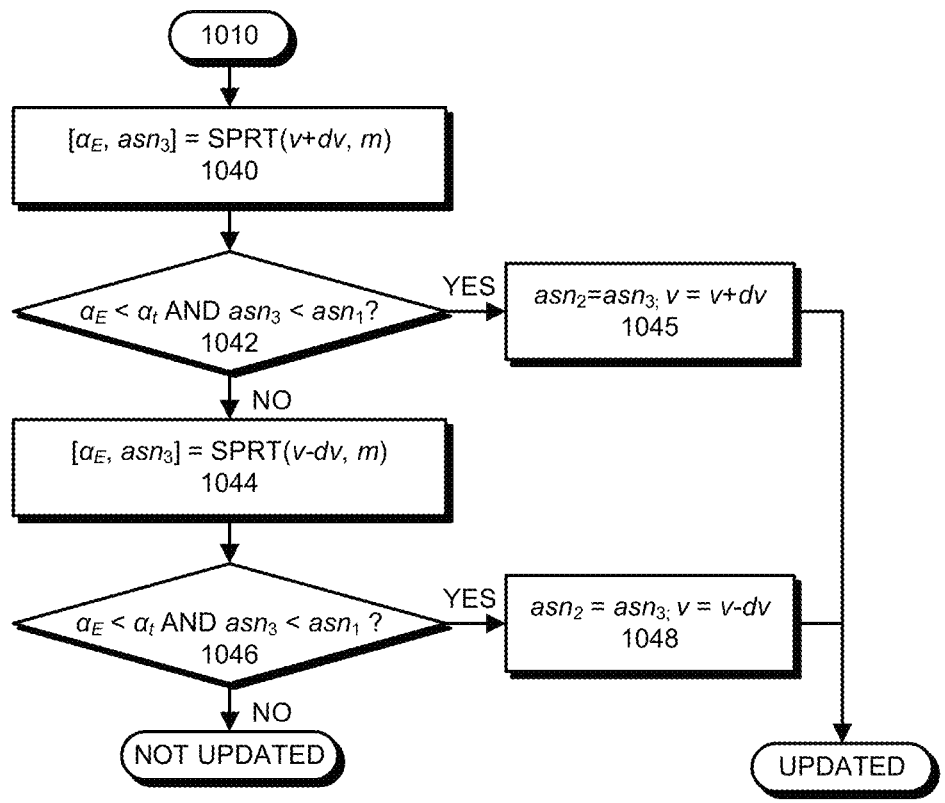
Figure 10C:
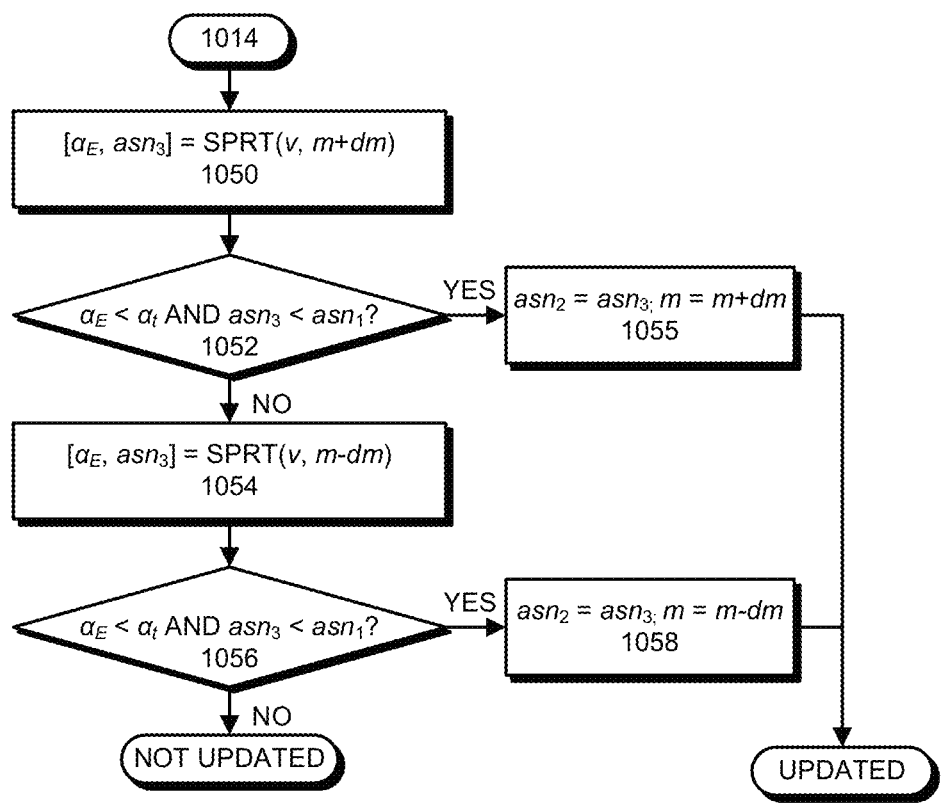

FIG. 8 presents a flow chart illustrating the process of performing a prognostic surveillance operation based on sensor signals from a power plant and associated transmission grid in accordance with the disclosed embodiments. First, the system obtains signals comprising time-series data obtained from sensors in the power plant and associated transmission grid during operation of the power plant and associated transmission grid (step 802). Next, the system uses an inferential model trained on previously received signals from the power plant and associated transmission grid to generate estimated values for the signals based on correlations between the signals (step 804). The system then performs a pairwise differencing operation between actual values and the estimated values for the signals to produce residuals (step 806). The system subsequently performs a SPRT on the residuals to detect incipient anomalies that arise during operation of the power plant and associated transmission grid (step 808). While performing the SPRT, the system dynamically updates SPRT parameters to compensate for non-Gaussian artifacts that arise in the sensor data due to changing operating conditions in the power plant and associated transmission grid (step 810). Finally, when an incipient anomaly is detected, the system generates a notification regarding the anomaly (step 812).

FIGS. 9 and 10A-10C present flow charts of the bivariate optimization process in accordance with the disclosed embodiments. At the start of this process, the system receives a number of parameters, including: an initial variance $v_0$, an initial disturbance magnitude parameter $m_0$, an initial variance delta $dv_0$, an initial disturbance magnitude delta $dm_0$, and an initial path-accelerator parameter PA (step 902). PA is a factor that is smaller than 1, which is periodically multiplied by dv and dm to reduce dv and dm over time.

Next, the system adjusts $v_0$, if necessary, so that the empirical false alarm probability $\alpha_E$ is below a threshold value $\alpha_t$ (step 904). This process is illustrated in more detail in FIG. 10A, wherein the system performs the SPRT based on $v_0$ and $m_0$ to generate resulting values for $\alpha_E$ and $asn_1$ (step 1030). Next, the system determines whether $\alpha_E<\alpha_t$ (step 1032). If not, the system sets $v_0=v_0+1$ (step 1034) and returns to step 1030. Otherwise, if $\alpha_E<\alpha_t$ at step 1032, step 904 is complete.

The system then initializes a number of variables by setting $v=v_0$ and $m=m_0$ (step 906). The system also sets $dv=dv_0*PA$, $dm=dm_0*PA$ and $asn_2=asn_1$ (step 908).

Next, the system attempts to update the variance v to reduce the resulting ASN value (step 910). This process is illustrated in more detail in FIG. 10B, wherein the system performs the SPRT based on v+dv and m to generate resulting values for $\alpha_E$ and $asn_3$ (step 1040). Next, the system determines whether $\alpha_E<\alpha_t$ and $asn_3<asn_1$ (step 1042). In essence, the system determines whether the ASN is reduced while maintaining $\alpha_E<\alpha_t$. If so, the system updates the variance and ASN values by setting $asn_2=asn_3$ and $v=v+dv$ (step 1045). The system then leaves step 910 through the "UPDATED" path and proceeds to step 920. Otherwise, if the determination was NO at step 1042, the system performs the SPRT based on v−dv and m to generate resulting values for $\alpha_E$ and $asn_3$ (step 1044). Next, the system determines whether $\alpha_E<\alpha_t$ and $asn_3<asn_1$ (step 1046). If so, the system updates the variance and ASN values by setting $asn_2=asn_3$ and $v=v-dv$ (step 1048). The system then leaves step 910 through the "UPDATED" path and proceeds to step 920. Otherwise, if the determination was NO at step 1046, the system leaves step 910 through the "NOT UPDATED" path and proceeds to step 914.

The system then attempts to update the system disturbance parameter m (step 914). This process is illustrated in more detail in FIG. 10C, wherein the system performs the SPRT based on v and m+dm to generate resulting values for $\alpha_E$ and $asn_3$ (step 1050). Next, the system determines whether $\alpha_E<\alpha_t$ and $asn_3<asn_1$ (step 1052). If so, the system updates the m and ASN values by setting $asn_2=asn_3$ and $m=m+dm$ (step 1055). The system then leaves step 914 through the "UPDATED" path and proceeds to step 920. Otherwise, if the determination was NO at step 1052, the system performs the SPRT based on v and m−dv to generate resulting values for $\alpha_E$ and $asn_3$ (step 1054). Next, the system determines whether $\alpha_E<\alpha_t$ and $asn_3<asn_1$ (step 1056). If so, the system updates the variance and ASN values by setting $asn_2=asn_3$ and $v=v-dv$ (step 1058). The system then leaves step 914 through the "UPDATED" path and proceeds to step 920. Otherwise, if the determination was NO at step 1056, the system leaves step 914 through the "NOT UPDATED" path and proceeds to step 916.

The system then attempts to reduce the path accelerator parameter PA. First, the system determines whether PA>1 (step 916). If so, the system reduces PA by setting PA=PA−1 (step 918). Otherwise, if PA is not >1 at step 916, the system skips step 918 and proceeds to step 920.

Next, the system evaluates a stopping criterion, which is either: (1) the ASN decreases by less than ε; or (2) the path acceleration (PA) factor is smaller than 1. (In one embodiment, the PA parameter is set to an initial value of 7, and ε is set to be 0.1%) We evaluate this stopping criterion by determining whether or not $(asn_1-asn_2)/asn_1<\varepsilon$, which means the normalized change in ASN is below a threshold ε) or PA<1, which means PA cannot be reduced further (step 920). If the stopping criterion is not met (NO at step 920), the system sets $asn_1=asn_2$ (step 924) and returns to step 908 to continue the optimization process. On the other hand, if the stopping is met (YES at step 920), the optimization process is complete, so the system outputs v and m (step 922) and stops.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing prognostic surveillance operations based on sensor signals from a power plant and associated transmission grid, comprising:
   obtaining signals comprising time-series data obtained from sensors in the power plant and associated transmission grid during operation of the power plant and associated transmission grid;
   using an inferential model trained on previously received signals from the power plant and associated transmission grid to generate estimated values for the signals based on correlations between the signals;
   performing a pairwise differencing operation between actual values and the estimated values for the signals to produce residuals;
   performing a sequential probability ratio test (SPRT) on the residuals to detect incipient anomalies that arise during operation of the power plant and associated transmission grid;
   while performing the SPRT, dynamically updating SPRT parameters to compensate for non-Gaussian artifacts that arise in the sensor data due to changing operating conditions in the power plant and associated transmission grid by performing a bivariate optimization operation, which varies both a system disturbance magnitude parameter m and a variance parameter v, while seeking to minimize a resulting decision-time value ASN and maintaining a resulting empirical false alarm probability $\alpha_E$ below a threshold value $\alpha_t$; and
   when an incipient anomaly is detected, generating a notification regarding the anomaly.

2. The method of claim 1, wherein the bivariate optimization operation involves:
   performing additional SPRT operations on the signals, wherein m and v are iteratively varied in both positive and negative directions to produce resulting values for $\alpha_E$ and ASN; and
   updating the m and v parameters whenever an additional SPRT operation causes a resulting ASN value to be reduced while a resulting $\alpha_E$ value remains less than $\alpha_t$.

3. The method of claim 2,
   wherein the bivariate optimization operation performs an initial SPRT operation using initial parameter values $m=m_0$ and $v=v_0$; and
   wherein when a resulting $\alpha_E$ value from the initial SPRT operation is greater than $\alpha_t$, the method further comprises iteratively performing additional SPRT operations wherein v is increased until a resulting $\alpha_E$ value is less than $\alpha_t$.

4. The method of claim 2, wherein step sizes for the iterative variations of m and v are reduced as the m and v parameters converge toward optimal values that minimize a resulting ASN value while maintaining a resulting $\alpha_E$ value below $\alpha_t$.

5. The method of claim 1, wherein the inferential model is trained using a nonlinear, nonparametric (NLNP) regression technique.

6. The method of claim 5, wherein the NLNP regression technique comprises a Multivariate State Estimation Technique (MSET).

7. The method of claim 1, wherein the signals are obtained from one or more of the following types of components in the power plant and associated transmission grid:
   a pump;
   a turbine;
   a motor;
   a generator;

a mechanical gear box;
a transformer;
a fluid-fluid or fluid-air heat-exchanger; and
an air blower.

8. The method of claim 7, wherein the signals are obtained from one or more of the following types of sensors located in components in the power plant and associated transmission grid:
  a voltage sensor;
  a current sensor;
  a pressure sensor;
  a rotational speed sensor; and
  a vibration sensor.

9. The method of claim 1, wherein detecting the incipient anomaly comprises detecting an impending failure of a component in the power plant and associated transmission grid.

10. A non-transitory, computer-readable storage medium storing instructions that when executed by a computer cause the computer to perform a method for performing prognostic surveillance operations based on sensor signals from a power plant and associated transmission grid, the method comprising:
  obtaining signals comprising time-series data obtained from sensors in the power plant and associated transmission grid during operation of the power plant and associated transmission grid;
  using an inferential model trained on previously received signals from the power plant and associated transmission grid to generate estimated values for the signals based on correlations between the signals;
  performing a pairwise differencing operation between actual values and the estimated values for the signals to produce residuals;
  performing a sequential probability ratio test (SPRT) on the residuals to detect incipient anomalies that arise during operation of the power plant and associated transmission grid;
  while performing the SPRT, dynamically updating SPRT parameters to compensate for non-Gaussian artifacts that arise in the sensor data due to changing operating conditions in the power plant and associated transmission grid by performing a bivariate optimization operation, which varies both a system disturbance magnitude parameter m and a variance parameter v, while seeking to minimize a resulting decision-time value ASN and maintaining a resulting empirical false alarm probability $\alpha_E$ below a threshold value $\alpha_t$; and
  when an incipient anomaly is detected, generating a notification regarding the anomaly.

11. The non-transitory, computer-readable storage medium of claim 10, wherein the bivariate optimization operation involves:
  performing additional SPRT operations on the signals, wherein m and v are iteratively varied in both positive and negative directions to produce resulting values for $\alpha_E$ and ASN; and
  updating the m and v parameters whenever an additional SPRT operation causes a resulting ASN value to be reduced while a resulting $\alpha_E$ value remains less than $\alpha_t$.

12. The non-transitory, computer-readable storage medium of claim 11,
  wherein the bivariate optimization operation performs an initial SPRT operation using initial parameter values $m=m_0$ and $v=v_0$; and
  wherein when a resulting $\alpha_E$ value from the initial SPRT operation is greater than $\alpha_t$, the method further comprises iteratively performing additional SPRT operations wherein v is increased until a resulting $\alpha_E$ value is less than $\alpha_t$.

13. The non-transitory, computer-readable storage medium of claim 11, wherein step sizes for the iterative variations of m and v are reduced as the m and v parameters converge toward optimal values that minimize a resulting ASN value while maintaining a resulting $\alpha_E$ value below $\alpha_t$.

14. The non-transitory, computer-readable storage medium of claim 10, wherein the inferential model is trained using a nonlinear, nonparametric (NLNP) regression technique.

15. The non-transitory, computer-readable storage medium of claim 14, wherein the NLNP regression technique comprises a Multivariate State Estimation Technique (MSET).

16. The non-transitory, computer-readable storage medium of claim 10, wherein detecting the incipient anomaly comprises detecting an impending failure of a component in the power plant and associated transmission grid.

17. A system that performs prognostic surveillance operations based on sensor signals from a power plant and associated transmission grid, comprising:
  at least one processor and at least one associated memory; and
  an anomaly-detection mechanism that executes on the at least one processor, wherein during operation, the anomaly-detection mechanism:
    obtains signals comprising time-series data obtained from sensors in the power plant and associated transmission grid during operation of the power plant and associated transmission grid;
    uses an inferential model trained on previously received signals from the power plant and associated transmission grid to generate estimated values for the signals based on correlations between the signals;
    performs a pairwise differencing operation between actual values and the estimated values for the signals to produce residuals;
    performs a sequential probability ratio test (SPRT) on the residuals to detect incipient anomalies that arise during operation of the power plant and associated transmission grid;
    wherein while performing the SPRT, the anomaly-detection mechanism dynamically updates SPRT parameters to compensate for non-Gaussian artifacts that arise in the sensor data due to changing operating conditions in the power plant and associated transmission grid by performing a bivariate optimization operation, which varies both a system disturbance magnitude parameter m and a variance parameter v, while seeking to minimize a resulting decision-time value ASN and maintaining a resulting empirical false alarm probability $\alpha_E$ below a threshold value $\alpha_t$; and
    wherein when an incipient anomaly is detected, the anomaly-detection mechanism generates a notification regarding the anomaly.

* * * * *